(12) United States Patent
Schmidt

(10) Patent No.: US 7,680,630 B2
(45) Date of Patent: Mar. 16, 2010

(54) MONITORING A PARAMETER WITH LOW POWER CONSUMPTION FOR AIRCRAFT LANDING GEAR-DATA LOGGER

(75) Inventor: Robert Kyle Schmidt, Pickering (CA)

(73) Assignee: Messier-Dowty Limited, Gloucester (GB)

( * ) Notice: Subject to any disclaimer, the term of this patent is extended or adjusted under 35 U.S.C. 154(b) by 0 days.

(21) Appl. No.: 10/512,661

(22) PCT Filed: Apr. 28, 2003

(86) PCT No.: PCT/GB03/01820

§ 371 (c)(1),
(2), (4) Date: Aug. 8, 2005

(87) PCT Pub. No.: WO03/091682

PCT Pub. Date: Nov. 6, 2003

(65) Prior Publication Data

US 2006/0106582 A1    May 18, 2006

(30) Foreign Application Priority Data

Apr. 26, 2002    (GB) .................................. 0209584.2

(51) Int. Cl.
*H03F 1/26* (2006.01)
(52) U.S. Cl. ..................................................... 702/189
(58) Field of Classification Search ................. 702/189, 702/182–185, 188; 701/35, 29, 31; 714/25
See application file for complete search history.

(56) References Cited

U.S. PATENT DOCUMENTS

| | | | | |
|---|---|---|---|---|
| 3,712,122 A | | 1/1973 | Harris et al. | |
| 3,946,358 A | * | 3/1976 | Bateman | 340/970 |
| 4,644,494 A | * | 2/1987 | Muller | 711/152 |
| 5,507,188 A | * | 4/1996 | Svaty, Jr. | 73/786 |
| 6,138,078 A | * | 10/2000 | Canada et al. | 702/44 |
| 6,209,390 B1 | * | 4/2001 | LaRue et al. | 73/112.01 |
| 6,246,320 B1 | | 6/2001 | Monroe | 340/506 |

(Continued)

FOREIGN PATENT DOCUMENTS

| | | |
|---|---|---|
| EP | 0 856 817 A1 | 8/1998 |
| WO | WO 03/091682 A1 | 11/2003 |

*Primary Examiner*—Edward Raymond
(74) *Attorney, Agent, or Firm*—Marshall, Gerstein & Borun LLP

(57) ABSTRACT

Apparatus for monitoring a parameter associated with a structural component comprises a module (1) which is attachable to the structural component and which is associated with a sensor (2) for making measurements of said parameter. The module incorporates a power supply (7) for powering the apparatus; a memory (4) for storing data from the sensor, and a processor (3) to process measurement signals from the sensor (2) and to store data in said memory (4). A display (5) for displaying measurements made by the sensor (2) may also be provided. The processor may make use of an algorithm such as a rainflow counting algorithm to reduce data stored. For energy saving, the sensor (2) is only powered on as required to take a measurement. The sensor (3) is interfaced to the processor through a signal processing subsystem (6) consisting of an amplifier and A to D converter, and each is turned on and off as required to power the sensor (2) for measuring. A sensor such as a tilt-switch (8) may also be used to control powering of the sensor (2). A communication link allows downloading of data from the memory, and recharging of the battery (7). Alternatively, the memory (4) and battery (7) are incorporated in a unit which is removable from the apparatus so that the data in the memory can be processed elsewhere.

24 Claims, 1 Drawing Sheet

U.S. PATENT DOCUMENTS

| | | | |
|---|---|---|---|
| 6,354,152 B1 * | 3/2002 | Herlik | 73/597 |
| 6,402,031 B1 | 6/2002 | Hall | 235/400 |
| 6,898,492 B2 * | 5/2005 | de Leon et al. | 701/35 |
| 7,117,122 B2 * | 10/2006 | Zielinski et al. | 702/183 |
| 2001/0052562 A1 * | 12/2001 | Ishihara et al. | 244/175 |
| 2004/0200900 A1 | 10/2004 | Hall | 235/400 |
| 2005/0276162 A1 * | 12/2005 | Brinkmann et al. | 367/77 |
| 2006/0027706 A1 * | 2/2006 | Lindahl et al. | 244/102 R |
| 2007/0138275 A1 | 6/2007 | Hall | 235/400 |
| 2007/0182544 A1 * | 8/2007 | Benson et al. | 340/521 |

* cited by examiner

MONITORING A PARAMETER WITH LOW POWER CONSUMPTION FOR AIRCRAFT LANDING GEAR-DATA LOGGER

TECHNICAL FIELD

This invention relates to apparatus for monitoring a parameter associated with a structural component.

There are many situations where a structural component may be subject to repeated loading over the course of its operating life which can cause fatigue and eventual failure of the component. Such situations include structural components in vehicles or buildings. A particular situation relevant to the invention is a component such as a strut in an aircraft landing gear, where safety is critical. There have been proposals to incorporate sensors into aircraft landing gear in order to detect landing loads and to compare these with predetermined maximum permitted loadings. However, these known sensors are incorporated into the landing gear structure and aircraft systems as integrated components.

An object of the invention is to provide improved monitoring apparatus which is easier to install and use, and which is preferably compact and lightweight with low power consumption for aerospace applications.

DISCLOSURE OF THE INVENTION

According to one aspect of the invention, apparatus for monitoring a parameter associated with a structural component comprising a module which is attachable to the structural component and which incorporates a processor for receiving and processing measurement signals corresponding to said parameter from a sensor, a memory for storing data from said processor, and a power supply for powering operation of a processor and memory, wherein the memory and power supply are incorporated in a unit which is removable from the module.

The fact that the apparatus according to the invention is incorporated as a module, makes it easy to instal on a structural component, and because a power supply is included, the module can be completely self-contained so that it does not need to be connected into any external electrical systems, such as those of a vehicle or aircraft on which it might be used.

Preferably, the processor makes use of an algorithm such as a rainflow counting algorithm when processing the measurement signals so as to reduce the amount of data stored.

Preferably, for reasons of energy saving, the sensor is only powered on as required to take a measurement. The sensor is interfaced to the processor through a signal processing subsystem. This subsystem consists of an instrumentation amplifier to provide gain to the sensor signal, an amplifier to provide regulated excitation to the sensor, and an analogue to digital converter to convert the amplified analogue sensor signal to a digital signal compatible with the processor. Each element in the subsystem is turned on and off as required to power on the sensor and to take a reading.

In order to further reduce power consumption of the apparatus, it is configured to be powered off under the control of a sensor switch which determines when measurements do not need to be made, for example, when a structural component in an aircraft landing gear is in a stowed condition. Also, the apparatus may have a low power "sleep" mode of operation which it assumes under certain conditions, for example, when sensor measurements remain substantially constant.

The memory and battery are incorporated in a unit which is removable from the apparatus so that the data in the memory can be processed elsewhere. This facilitates use of the apparatus in the field, and reduces the need for skilled personnel to operate and maintain the apparatus.

Display means, such as an LCD display screen, may be provided which displays information about the structural component as well as data derived from measurement of the sensor. The display may show data derived over a period of time or may give an indication of the function, status, or performance of the component such as its fatigue life or remaining service life.

According to another aspect, the invention comprises apparatus for monitoring a parameter associated with the structural component comprising a module which is attachable to the structural component and which incorporates a processor for receiving and processing measurement signals corresponding to said parameter from a sensor, a memory for storing data from said processor, and a power supply for powering operation of the apparatus, the apparatus further comprising display means which displays information about the structural components as well as data derived from measurement of the sensor.

DESCRIPTION OF THE DRAWING

The invention will now be described by way of example with reference to the accompanying schematic drawing of a self-contained, self-powered module suitable for use in an aircraft landing gear to monitor fatigue life of a strut.

EMBODIMENT OF THE INVENTION

Figure 1:
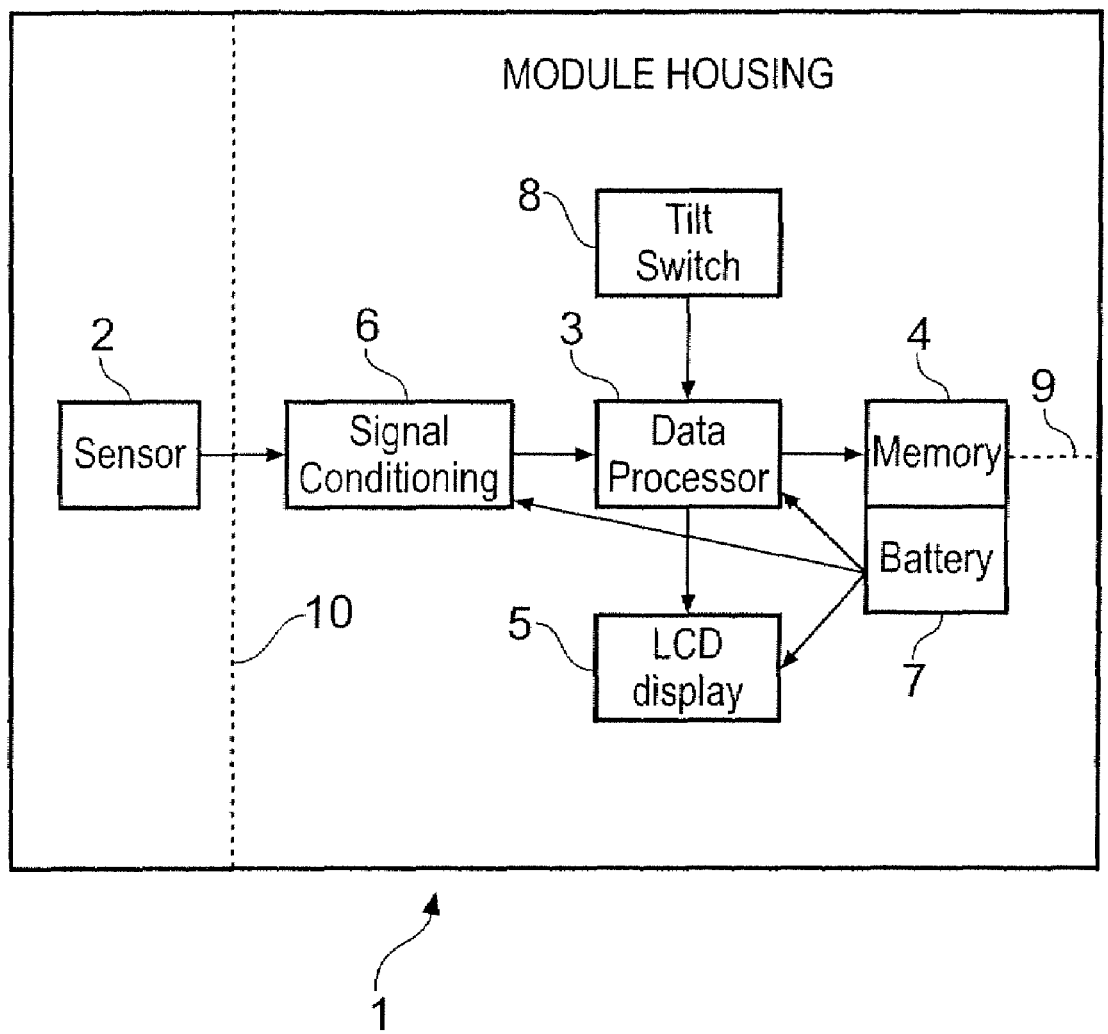

The module consists of a housing 1 which is adapted for connection to a strut of an aircraft landing gear. The housing forms a sealed enclosure once it is connected in place. The housing 1 incorporates a strain gauge 2 that measures the strain in the structural component when it is loaded during operation of the aircraft. Strain measurement signals generated by the strain gauge 2 are fed to an electrical subsystem 6 which performs signal conditioning (excitation and amplification) and analogue to digital conversion. A digital representation of the strain measurement signal is output from the subsystem 6 to a system controller and data processor unit 3, which then produces an appropriate data output for storage in a memory 4. An output from the unit 3 is connected to an LCD display 5 which is visible externally of the housing 1 for maintenance personnel to read. Also, a power supply in the form of a 3-volt lithium coin cell 7 is incorporated within the housing 1 and powers all of the electrical components. A tilt sensor switch 8 is also incorporated in the housing 1 and produces an output to the unit 3.

In operation, when the landing gear is stowed, the tilt sensor switch 8 produces an output, which powers down the electronic components so that no strain measurements are being made by the strain gauge or being processed by the unit 3. However, when the landing gear is deployed by the aircraft for landing, the tilt sensor switch 8 operates to power on the electronic components so that the strain gauge 2 starts to make measurements of the strain in the strut of the landing gear. Strain measurements made by the gauge are generated at a rate which is typically 50 Hz but which may be varied to suit different applications. The unit 3 analyses this data so as to identify peak and minimum values and then rainflow counts and then stores these values in the memory 4 and discards intermediate values. The use of a rainflow algorithm serves to reduce the amount of data that is stored in the memory. Furthermore, because individual strain measurements are only made during a small portion of each sampling cycle, the gauge 2 is powered by the subsystem 6 only on command from the unit 3 so that it is only powered up during the sampling time. Typically, a measurement interval is 4 ms long compared with a measurement cycle of 20 ms. Therefore, during the remaining 16 ms of a measurement cycle, the strain gauge is turned off, and the unit 3 is put in a low power "sleep" mode to save power.

The subsystem 6 is also configured to monitor changes in the strain measurements over a predetermined period of time and to put certain electronic components such as the system controller and data processor unit 3 into a low power "sleep" mode when strain measurements remain constant or vary only slightly.

In another embodiment of the invention, the tilt sensor switch 8 may be replaced or used in conjunction with another type of sensor switch, such as a vibration sensor switch, to convert to or from the low power "sleep" condition.

The data stored in the memory 4 takes the form of a 3-dimensional strain histogram matrix and can be analysed to produce information about the fatigue life of the landing gear or the remaining useful service life of the landing gear or to identify hard landings. In order to access this data, the memory 4 and power supply 7 are incorporated together in a unit which is removable from the housing 1 so that this unit can then be taken to a data processing centre. The memory/power unit can then be replaced by a similar unit containing a fully charged battery. Each memory/battery unit is identified by a unique electronic serial number for tracking purposes.

In an alternative embodiment of the invention, a communication link 9 is provided to allow downloading of data from the memory in situ. Also, the battery may be rechargeable in situ via the same link 9 or a different link.

In order to reduce the power consumption of the module, it preferably employs low power electronics, the memory preferably being a ferro-electric RAM and the strain gauge preferably being a high resistance strain gauge. The overall low power consumption means that the module can have a long operating life which might exceed 3000 hours using a 2000 mAh lithium coin cell operating at 3 volts.

In an alternative embodiment of the invention, the LCD display 5 may be omitted.

In yet another embodiment of the invention, the system controller and data processor unit 3 may be adapted so that it can support multiple data processing channels, and a separate sensor 2 is provided for each channel to allow multiple parameters, of the same type or different types, to be monitored.

In other embodiments of the invention, the strain gauge 2 may be replaced by another type of sensor to secure another parameter associated with the landing gear or other structures, mechanisms or systems, Typical parameters include pressure, displacement or temperature, and the parameter may be associated directly with the structural component or may be associated with its environment, such as external temperature, or its function, performance or status. That is, apparatus according to the invention is concerned with what is commonly known as health and usage monitoring of components and systems.

According to another aspect, the invention comprises apparatus for monitoring a parameter associated with the structural component comprising a module which is attachable to the structural component and which incorporates a processor for receiving and processing measurement signals corresponding to said parameter from a sensor, a memory for storing data from said processor, and a power supply for powering operation of the apparatus, the apparatus further comprising display means which displays information about the structural components as well as data derived from measurement of the sensor.

In other embodiments of the invention, the sensor or sensors 2, instead of being incorporated in housing 1, may be separate from housing 1, as indicated by the broken line 10, so that the sensor or sensors 2 can each be located in a separate location from housing 1.

The invention claimed is:

1. An apparatus for monitoring a parameter associated with a structural component comprising a module which is attachable to the structural component and which incorporates a processor for receiving and processing measurement signals corresponding to said parameter from a sensor, a memory for storing data from said processor, and a stored power source for powering operation of the apparatus, wherein the memory and stored power source are incorporated in a unit which is removable from the module.

2. An apparatus as claimed in claim 1 in which the processor makes use of an algorithm when processing the measurement signals so as to reduce the amount of data stored.

3. An apparatus as claimed in claim 2 in which the algorithm is a rainflow counting algorithm.

4. An apparatus as claimed in claim 1 in which the sensor is interfaced to the processor through a signal processing subsystem.

5. An apparatus as claimed in claim 4 in which the subsystem consists of an instrumentation amplifier to provide gain to the measurement signal, and an analogue-to-digital converter to convert the amplified analogue measurement signal to a digital signal compatible with the processor.

6. An apparatus as claimed in claim 5 in which each element in the subsystem is turned on and off as required to power on the sensor so as to take a measurement.

7. An apparatus as claimed in claim 1 including a sensor switch which determines when measurement do and do not need to he made.

8. An apparatus as claimed in claim 7 in which the sensor switch determines when a structural component in an aircraft landing gear is in a stowed condition.

9. An apparatus as claimed in claim 1 having a low power "sleep" mode of operation which it assumes under certain conditions.

10. An apparatus as claimed in claim 9 in which said certain conditions comprise when sensor measurements remain substantially constant.

11. An apparatus as claimed in claim 1, wherein the power supply comprises a battery, the apparatus having a data port to allow downloading of data from the memory, and recharging of the battery at the same time.

12. An apparatus as claimed in claim 1 including display means which displays information about the structural component as well as data derived from measurements of the sensor.

13. An apparatus as claimed in claim 12 in which the display shows data derived over a period of time, or gives an indication of the function, status or performance of the component such as its fatigue life or remaining service life.

14. An apparatus as claimed in claim 1 including a sensor to measure said parameter.

15. An apparatus as claimed in claim 14 in which the sensor is incorporated into the module.

16. A monitoring system comprising multiple modules for monitoring parameters associated with different parts of a structure, each module being as claimed in claim 1 and having associated with it a sensor for making measurements of one of said parameters.

17. The system as claimed in claim 16 which includes additional sensor producing inputs determined by other aspects of the structure, such as the operating system of a vehicle or aircraft.

18. An apparatus as claimed in claim 12 in which the display means comprises an LCD display.

19. An apparatus as claimed in claim 1 in which the power supply comprises a battery.

20. An apparatus for monitoring a parameter associated with a structural component comprising a module which is attachable to the structural component and which incorporates a processor for receiving and processing measurement signals corresponding to said parameter from a sensor, a memory for storing data from said processor, and a stored power source for powering operation of the apparatus, the module further comprising display means which displays information about the structural component as well as data derived from measurement of the sensor.

21. An apparatus as claimed in claim 20 in which the display means comprises an LCD display.

22. An apparatus as clamed in claim 20 in which the power supply comprises a battery.

23. An apparatus for monitoring a parameter associated with a structural component comprising a module which is attachable to the structural component and which incorporates a processor for receiving and processing measurement signals corresponding to said parameter from a sensor, a memory for storing data from said processor, and a stored power source for powering operation of the apparatus, wherein the memory and stored power source are incorporated in a unit which is removable from the module so that a function involving the memory and/or the power source may he performed separate from the module.

24. An apparatus for monitoring a parameter associated with a structural component comprising a module which is attachable to the structural component and which incorporates a processor for receiving and processing measurement signals corresponding to said parameter from a sensor, a memory for storing data from said processor, and a stored power source for powering operation of the apparatus, the module further incorporating display means which displays information about the structural component as well as data derived from measurement of the sensor.

\* \* \* \* \*